(12) United States Patent
Kumpera et al.

(10) Patent No.: US 10,657,044 B2
(45) Date of Patent: *May 19, 2020

(54) RUNTIME MEMORY MANAGEMENT USING MULTIPLE MEMORY MANAGERS

(71) Applicant: Xamarin Inc., San Francisco, CA (US)

(72) Inventors: Rodrigo Vitezlav Martucci Kumpera, Boston, MA (US); Rolf Bjarne Kvinge, Madrid (ES); Aaron Dean Bockover, Raleigh, NC (US); Christopher Ryan Hamons, Austin, TX (US); Sebastien Pouliot, Quebec (CA); Miguel de Icaza, Boston, MA (US)

(73) Assignee: Xamarin Inc., San Francisco, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/968,669

(22) Filed: Dec. 14, 2015

(65) Prior Publication Data

US 2016/0283370 A1 Sep. 29, 2016

Related U.S. Application Data

(63) Continuation of application No. 14/667,380, filed on Mar. 24, 2015, now Pat. No. 9,213,638.

(51) Int. Cl.
*G06F 12/02* (2006.01)
*G06F 3/06* (2006.01)

(52) U.S. Cl.
CPC ........ *G06F 12/0253* (2013.01); *G06F 3/0604* (2013.01); *G06F 3/0631* (2013.01);
(Continued)

(58) Field of Classification Search
None
See application file for complete search history.

(56) References Cited

U.S. PATENT DOCUMENTS

| 5,280,617 A | 1/1994 | Brender et al. |
| 5,293,630 A | 3/1994 | Tatge et al. |

(Continued)

FOREIGN PATENT DOCUMENTS

EP 0529049 A1 3/1993

OTHER PUBLICATIONS

Office Communication for U.S. Appl. No. 14/337,064 dated Sep. 9, 2014 (21 pages).

(Continued)

*Primary Examiner* — Gary W. Cygiel
(74) *Attorney, Agent, or Firm* — Dicke, Billig & Czaja, PLLC

(57) ABSTRACT

Embodiments are directed towards managing memory for an application be executing in a managed runtime environment. Managed peer objects may be generated to correspond to native objects executing in a native runtime environment such that memory may be allocated for managed peer objects. Garbage collection handles may be generated and associated with the managed peer objects. If the managed application executes instructions that interact with the managed peer objects and the native runtime environment each garbage collection handle associated with the managed peer objects may be modified based on a type of an interaction. The garbage collection handlers may be garbage collection roots for a garbage collector that may be included in the managed runtime memory manager. If a garbage collection event occurs, memory for the managed peer objects may be deallocated based in part on its correspondent garbage collection handle.

20 Claims, 10 Drawing Sheets

(52) U.S. Cl.
CPC ........ *G06F 3/0673* (2013.01); *G06F 12/0261* (2013.01); *G06F 12/0269* (2013.01); *G06F 2212/1044* (2013.01); *G06F 2212/251* (2013.01)

(56) References Cited

U.S. PATENT DOCUMENTS

| | | | |
|---|---|---|---|
| 5,493,675 | A | 2/1996 | Faiman et al. |
| 5,706,491 | A | 1/1998 | McMahan |
| 5,933,642 | A | 8/1999 | Greenbaum et al. |
| 6,381,738 | B1 | 4/2002 | Choi et al. |
| 6,389,590 | B1 | 5/2002 | Miller et al. |
| 6,615,340 | B1 | 9/2003 | Wilmot, II |
| 6,789,254 | B2 | 9/2004 | Broussard |
| 6,851,108 | B1 | 2/2005 | Syme et al. |
| 6,865,733 | B2 | 3/2005 | Broussard |
| 7,181,737 | B2 | 2/2007 | de Jong et al. |
| 7,210,134 | B1 | 4/2007 | Langer |
| 7,596,778 | B2 | 9/2009 | Kolawa et al. |
| 8,006,239 | B2 | 8/2011 | Sankaranarayanan et al. |
| 8,245,210 | B2 | 8/2012 | Ng et al. |
| 8,640,093 | B1 | 1/2014 | Gill et al. |
| 8,683,462 | B2 | 3/2014 | Goldman |
| 8,838,656 | B1 | 9/2014 | Cheriton |
| 9,027,004 | B1 | 5/2015 | Johnson et al. |
| 9,183,020 | B1 | 11/2015 | de Icaza et al. |
| 9,201,637 | B1 | 12/2015 | Kvinge et al. |
| 9,459,847 | B2 | 10/2016 | de Icaza et al. |
| 2003/0093780 | A1 | 5/2003 | Freudenberger et al. |
| 2003/0126590 | A1 | 7/2003 | Burrows et al. |
| 2005/0132328 | A1 | 6/2005 | Bulusu |
| 2007/0088636 | A1 | 4/2007 | Nault |
| 2008/0270482 | A1* | 10/2008 | Hillberg .............. G06F 12/0253 |
| 2008/0320453 | A1 | 12/2008 | Meijer et al. |
| 2010/0070957 | A1 | 3/2010 | Mariani et al. |
| 2010/0287536 | A1 | 11/2010 | Chung et al. |
| 2012/0304044 | A1 | 11/2012 | Leithead et al. |
| 2016/0019037 | A1 | 1/2016 | Varga |
| 2016/0132303 | A1 | 5/2016 | de Icaza et al. |
| 2017/0131981 | A1 | 5/2017 | de Icaza et al. |

OTHER PUBLICATIONS

Achten, P. et al., "When generic functions use dynamic values," 2002 Proceedings of the 14th International Conference on Implementation of Functional Language, Lecture Notes in Computer Science, (2003) pp. 17-33.
Office Communication for U.S. Appl. No. 14/337,064 dated Feb. 23, 2015 (19 pages).
Office Communication for U.S. Appl. No. 14/337,064 dated May 12, 2015 (4 pages).
Office Communication for U.S. Appl. No. 14/670,218 dated May 27, 2015 (8 pages).
Office Communication for U.S. Appl. No. 14/537,298 dated Feb. 25, 2015 (9 pages).
Office Communication for U.S. Appl. No. 14/537,298 dated Jul. 8, 2015 (5 pages).
Office Communication for U.S. Appl. No. 14/667,380 dated Jun. 16, 2015 (8 pages).
Office Communication for U.S. Appl. No. 14/337,064 dated Jun. 16, 2015 (20 pages).
Office Communication for U.S. Appl. No. 14/670,218 dated Sep. 18, 2015 (8 pages).
Office Communication for U.S. Appl. No. 14/667,380 dated Sep. 23, 2015 (5 pages).
Jazayeri, M. et al., "End-user Programming of Web-native Interactive Applications," Computer Systems and Technologies Proceedings of the 12th International Conference, 2011, pp. 11-16.
Charland, A. et al., "Mobile Application Development: Web vs. Native." acmqueue, Mobile Computing, 2011, 9 pages.
Office Communication for U.S. Appl. No. 14/337,064 dated Nov. 24, 2015 (20 pages).
Office Communication for U.S. Appl. No. 14/936,546 dated Feb. 23, 2016, (9 pages).
"Final Office Action Issued in U.S. Appl. No. 14/337,064", dated Aug. 10, 2016, 24 Pages.
"Final Office Action Issued in U.S. Appl. No. 14/337,064", dated Jun. 2, 2017, 24 Pages.
"Non-final Office Action Issued in U.S. Appl. No. 14/337,064", dated Oct. 18, 2017, 21 Pages.
"Non-final Office Action Issued in U.S. Appl. No. 14/337,064", dated Jan. 11, 2017, 21 Pages.
"Non-final Office Action Issued in U.S. Appl. No. 14/337,064", dated Mar. 23, 2016, 20 Pages.
"Search Report Issued in European Patent Application No. 15177414.8", dated Dec. 21, 2015, 8 Pages.
Shao, et al., "A Type-Based Compiler for Standard ML", In Proceedings of the ACM SIGPLAN Conference on Programming Language Design and Implementation, Issue 6, Jun. 18, 1995, pp. 116-129.
Tarditi, et al., "TIL: A Type-Directed Optimizing Compiler for ML", In Proceedings of the ACM SIGPLAN 1996 Conference on Programming Language Design and Implementation, vol. 31, Issue 5, May 1, 1996, pp. 181-192.
"Notice of Allowance Issued in U.S. Appl. No. 14/936,546", dated May 18, 2016, 5 Pages.
"Notice of Allowance Issued in U.S. Appl. No. 15/285,190", dated Jan. 3, 2018, 6 Pages.
"Non Final Office Action Issued in U.S. Appl. No. 14/337,064", dated Apr. 9, 2018, 20 Pages.
"Non Final Office Action Issued in U.S. Appl. No. 14/337,064", dated Aug. 10, 2018, 20 Pages.
"Office Action Issued in European Patent Application No. 15177414.8", dated Jan. 22, 2019, 7 Pages.
Dragos, et al., "Compiling Generics Through User-Directed Type Specialization", In Proceedings of the 4th Workshop on the Implementation, Compilation, Optimization of Object-Oriented Languages and Programming Systems, Jul. 6, 2009, pp. 42-47.
Sallenave, et al., "Lightweight Generics in Embedded Systems through Static Analysis", In Proceedings of ACM SIGPLAN Conference on Programming Language Design and Implementation, Jun. 12, 2012, pp. 11-20.
"Final Office Action Issued in U.S. Appl. No. 14/337,064", dated Mar. 11, 2019, 21 Pages.

* cited by examiner

RUNTIME MEMORY MANAGEMENT USING MULTIPLE MEMORY MANAGERS

CROSS-REFERENCE TO RELATED APPLICATION(S)

This Utility Patent Application is a Continuation of U.S. patent application Ser. No. 14/667,380 filed on Mar. 24, 2015, now U.S. Pat. No. 9,213,638 issued on Dec. 15, 2015, the benefit of which is claimed under 35 U.S.C. § 120, and which is further incorporated by reference in its entirety.

TECHNICAL FIELD

This invention relates generally to software application development, and more particularly, but not exclusively, to managing memory using multiple memory managers during runtime.

BACKGROUND

A highly competitive application marketplace and the consumerization of information technology have put tremendous pressure on application developers to deliver high quality user experiences for both consumers and employees on numerous and varied target platforms. Accordingly, it may be advantageous to employ modern cross-platform software development tools to enable application developers to develop applications that target more than one platform. Further, modern programming languages may include features that allow for efficient and safer programming of applications. Some of the modern programming languages may employ one or more runtime memory management features for applications that are executing on the target platform. However, in some cases, some target platform may employ memory managers that may interoperate poorly with the memory management features supported by the cross-platform software development tools. Namely, some mobile computers (e.g., smartphones, tablets, or the like), game consoles, and so on, may provide memory management features that may interfere with the memory management features supported by the cross-platform software development tools. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DETAILED DESCRIPTION OF THE VARIOUS EMBODIMENTS

Figure 1:
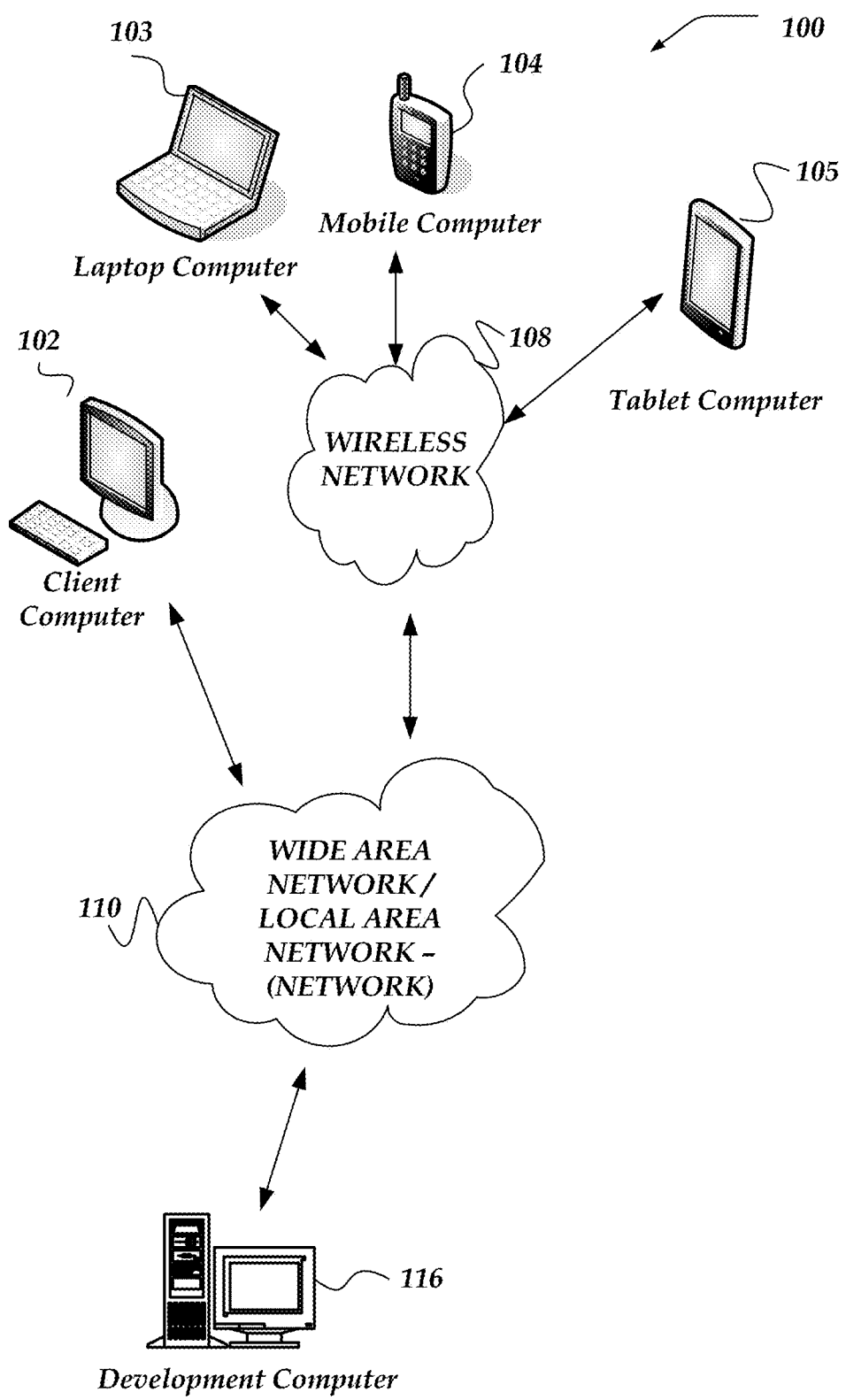
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein; rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "application" as used herein refers to a computing/software application designed to operate on one of more target computers/platforms. One of ordinary skill in art the will appreciate that many type of applications may benefit from these innovations and are within the scope and spirit of the disclosed innovations, including, but not limited to, web applications, web pages, desktop applications, video games, mobile applications, media players, office applications, utilities, or the like.

The term "application developer" as used herein refers to users that design and develop applications. Application developers may create and deploy applications for use on various target platforms.

The term "mobile computer" as used herein refers to client computers and may include tablet computers, handheld computers, wearable computers, desktop computers, or the like. Mobile computers may also include notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, game consoles, integrated devices combining at least one of the preceding computers, or the like.

The terms "target platform," "target computer" as used herein refer to computers, such as, mobile computers, client computers, smart televisions, game consoles, set-top cable boxes (for televisions), smart home appliances, or the like, upon which applications are intended to be deployed. In at least one of the various embodiments, source code for an application may be compiled into machine code that is compatible for execution on one or more target computers. Different types of target computers may require compilers to generate machine code that is particular to the machine architecture of the particular target computers.

The term "runtime environment" as used herein may refers applications/facilities that provide the executable environment that enable one or more applications to run on a target platform. In some embodiments, a runtime environment may comprise a virtual machine and one or more supporting libraries and/or subsystems. Also, runtime environments may be arranged to support more than one computer programming language. Examples, may include, Java Runtime Environment (JRE), Microsoft's, Common Language Runtime (CLR), or the like.

The term "managed code environment," or "managed runtime environment" as used herein refers to a runtime environment or a portion of a runtime environment where the runtime environment has control and visibility of the memory, threads, of execution, resources, or the like.

The term "unmanaged code environment," "unmanaged runtime environment," and "native code environment" as used herein refer to execution environments on the target platform where the managed runtime does not have as much control or visibility as it does within managed code environments. In some cases, unmanaged environments may be considered to be outside of the control of the managed runtime. Typically, unmanaged code environments are encountered if threads executing in a managed environment call or access native services or facilities on the target platform that are outside of the managed runtime, such as, user interface objects, networking services, file systems, system libraries, or the like, or combination thereof.

The terms "native environment," "native runtime," or "native runtime environment" as used herein refers to an unmanaged code environment as described above.

The term "native code call" as used herein refers to a function call that will be executed in the unmanaged code environment. In at least one of the various embodiments, a compiler may be insert native code calls into an application if the application needs to access various native services or facilities provided by the target platform. For example, native code calls may include, user-interface access/display, file system access, network operations, interprocess communication, date/time functions, math functions, string processing functions, synchronization operations (e.g., locks, semaphores, mutexes, and so on), user interface functions, or the like.

The term "garbage collection" as used herein refers to one or more methods for automatic runtime memory management that may performed by a memory manager. Garbage collection tasks may include freeing or deleting memory that is no longer being used, de-fragmenting one or more memory pools used by the runtime environment, compacting the memory used by the runtime environment, or the like, or combination thereof. In most cases, garbage collection frees application developers from having to use error prone manual memory management for their applications. One of ordinary skill in the art will appreciate that there are many well-known ways for implementing garbage collection for runtime environments. Garbage collection schemes entail tracking the memory objects that are currently being used so any unused memory object may be discarded and/or freed. Further, in some cases, garbage collection also entails defragmenting or otherwise optimizing the memory pools used for allocating memory to memory objects. A garbage collector may be a facility provided by the runtime environment for performing garbage collection for the runtime environment.

In at least one of the various embodiments, garbage collectors may be arranged to receive inputs that are called garbage collection roots (GC Roots). GC Roots may be traced for determining the status of the memory objects used by the system. The GC Roots may be the references to a memory object graph from which the relevant memory objects may be determined and referenced.

In at least one of the various embodiments, garbage collection may be a resource intensive/time consuming operation so garbage collectors are often arranged to perform garbage collection only when needed. Accordingly, a managed runtime may be arranged to monitor the current memory usage/availability of memory and trigger garbage collection if a memory threshold may be exceeded. Likewise, a managed runtime may be arranged to monitor its computing performance utilization to initiate garbage collection when the runtime is idle and/or underutilized.

The term "reference counting" as used herein refers to one or more methods for runtime memory management that may performed by a memory manager. A memory manager may maintain reference count value for each object or resource that is allocated memory. This running count of the number of references to an object or resource may be used to determine if it is safe to free (deallocate) the memory that corresponds to the object or resource. Accordingly, if the reference count value for an object in memory indicates that it is not referenced by another object, the memory manager may delete the object and free its memory. In contrast, if the reference count value indicates that there may be objects referencing an object, a memory manager is likely to refrain from deleting the object and freeing its memory.

The term "weak reference" as used herein refers to a reference made from a source object to a target object where the reference to the target object is not considered by the garbage collector. Accordingly, an object that is weakly referenced should not be considered persistent since a garbage collector may deallocate it at any time since the weak reference does not signal to memory manager that object is being used. If the memory manager uses reference counting to track object usage, assigning an object to a weak reference property will not increase the assigned object's reference count value. Various environments provide support for weak references, especially if reference counting is used.

The term "garbage collector handle (GC Handle)" as used herein refers to information associated with a managed peer object that is added to the GC Root collection of a garbage collector.

The term "strong reference garbage collector handle" as used herein refers to a GC Handle that indicates that that associated managed peer object should not be deallocated during garbage collection. This includes situations where there are no longer any managed objects referencing the strong reference GC Handle. A strong reference GC Handle may also be referred to as a strong GC Handle. Also, strong GC Handle may be traced during garbage collection as if they were a normal GC Root. Accordingly, managed object reference by a managed peer object that has a strong GC Handle will be retained rather than released and deallocated during garbage collection.

The term "weak reference garbage collector handle" as used herein refers to a GC Handle that indicates that its associated managed peer object may be deallocated during garbage collection—unless it is referenced by another managed object. A weak reference GC Handle may also be referred to as a weak GC Handle. Also, weak GC Handles are not traced during garbage collection. Accordingly, managed objects referenced by a managed peer object that has a weak GC Handle may be released and deallocated during garbage collection unless they are referenced by other managed objects.

The term "binding layer" as used herein refers portion of the managed runtime that is arranged to provide interoperation between the managed runtime environment and the native runtime environment. Interfaces and objects provided by the binding layer enable managed application executing in the managed runtime to inter-operate with objects and resources in the native runtime environment.

The term "peer object" as used herein refers to an object or resource that exists both in the managed runtime environment and the native runtime environment.

The terms "managed peer object," or "managed peer" as used herein refer to a managed object that corresponds to a native object.

The terms "native peer," or "native peer object" as used herein refer to the native runtime environment portion of a peer object.

The terms "framework peer," or "framework peer object" as used herein refer to a managed peer that represents a framework (system) object of the native runtime environment. For example, framework peers may be objects that represent user interface elements that are provided by the native runtime environment.

The terms "user peer," or "user peer object" as used herein refers to a managed peer object used in the managed runtime environment that derives from a framework peer.

The term "backing field" as used herein refers to a field (or property) of a framework peer (accessible in the managed runtime) that corresponds to a field or property in the native peer. In many cases, the backing fields correspond to properties/fields of native objects that are weak references.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards managing memory for an application. In at least one of the various embodiments, a managed application may be executing in a managed runtime environment. In at least one of the various embodiments, one or more managed peer objects may be generated that correspond to one or more native objects that may be executing in a native runtime environment such that memory is allocated for the one or more managed peer objects.

In at least one of the various embodiments, the memory allocated for the one or more managed peer objects may be managed by a memory manager in the managed runtime environment that may be separate from another memory manager that the manages memory for the one or more native objects executing in the native runtime environment.

In at least one of the various embodiments, one or more garbage collection handles may be generated such that each garbage collection handle may be associated with one of the one or more managed peer objects.

In at least one of the various embodiments, if the managed application executes one or more instructions that interact with the one or more managed peer objects and the native runtime environment, additional actions may be performing including the following.

In at least one of the various embodiments, each garbage collection handle associated with the one or more managed peer objects may be modified based on a type of an interaction. In at least one of the various embodiments, if a native runtime reference count value that corresponds to a managed peer object is less than two, its correspondent managed peer object's garbage collection handle may be modified to become a weak reference garbage collection handle. Also, in at least one of the various embodiments, if a native runtime reference count value that corresponds to a managed peer object is greater than one, the correspondent managed peer object's garbage collection handle may be modified to become a strong reference garbage collection handle.

In at least one of the various embodiments, the one or more garbage collection handlers may be garbage collection roots for a garbage collector that may be included in the managed runtime memory manager.

In at least one of the various embodiments, if the type of interaction is an assignment of another managed peer object to a weak peer field of a managed peer object, the managed peer object's garbage collection handle may be modified to become a strong reference garbage collection handle. And, in at least one of the various embodiments, one or more managed peer objects may be registered with a managed runtime memory manager.

In at least one of the various embodiments, if a garbage collection event occurs, memory for the one or more managed peer objects may be deallocated based in part on its correspondent garbage collection handle. In at least one of the various embodiments, if a garbage collection event occurs, a native runtime reference count value for each registered managed peer object may be determined, and the garbage collection handle for each registered managed peer object may be modified based on its correspondent native runtime reference count value.

In at least one of the various embodiments, deallocating memory for the one or more managed peer objects includes retaining the memory for the one or more managed peer objects that are associated with a strong reference garbage collector handle.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Development Computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Development Computer 116, or other computers.

Client computers 102-105 may further be configured to include a client application that enables an end-user to log into an end-user account that may be managed by another computer, such as Development Computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, Development Computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Development Computer 116 is described in more detail below in conjunction with FIG. 3. Briefly, however, Development Computer 116 includes virtually any network computer capable of performing actions for generating software applications for a client computer.

Although FIG. 1 illustrates Development Computer 116 as a single computer, the innovations and/or embodiments are not so limited. For example, one or more functions of Development Computer 116 may be distributed across one or more distinct network computers. Moreover, Development Computer 116 is not limited to a particular configuration such as the one shown in FIG. 1. Thus, in one embodiment, Development Computer 116 may be implemented using a plurality of network computers and/or client computer. In other embodiments, development computer may operate as a plurality of network computers within a cluster architecture, a peer-to-peer architecture, or the like. Further, in at least one of the various embodiments, Development Computer 116 may be implemented using one or more cloud instances in one or more cloud networks.

Illustrative Client Computer

Figure 2:
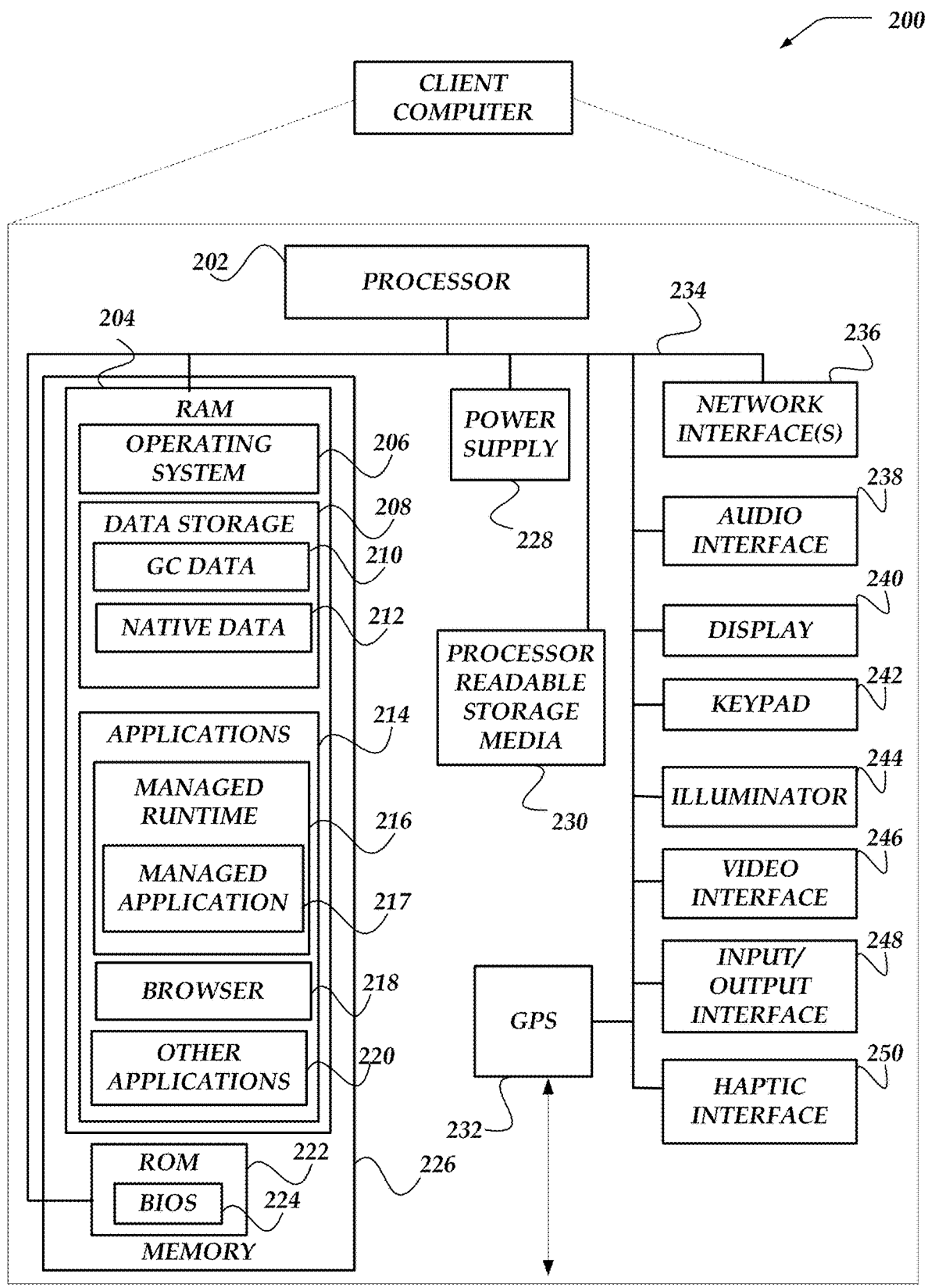
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG.

2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content. In at least one of the various embodiments, a portion of data storage 208 may be arranged to store garbage collection data (GC data) 210 for storing memory object and object information related to garbage collection. Also, in at least one of the various embodiments, a portion of data storage 208 may be arranged to store native data 212 for memory objects that may be managed by a native memory management system.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and other types of telecommunication with another user of another client computer. Applications 214 may include, for example, a browser 218, and other applications 220.

Further, applications 214 may include one or more managed runtime environments, such as managed runtime 216. Also, one or more managed applications, such as, managed application 217 may be hosted by managed runtime 216. Likewise, other application 220 may include one or more native applications that are running in the native environment provided by operating system 206.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as Development Computer 116 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
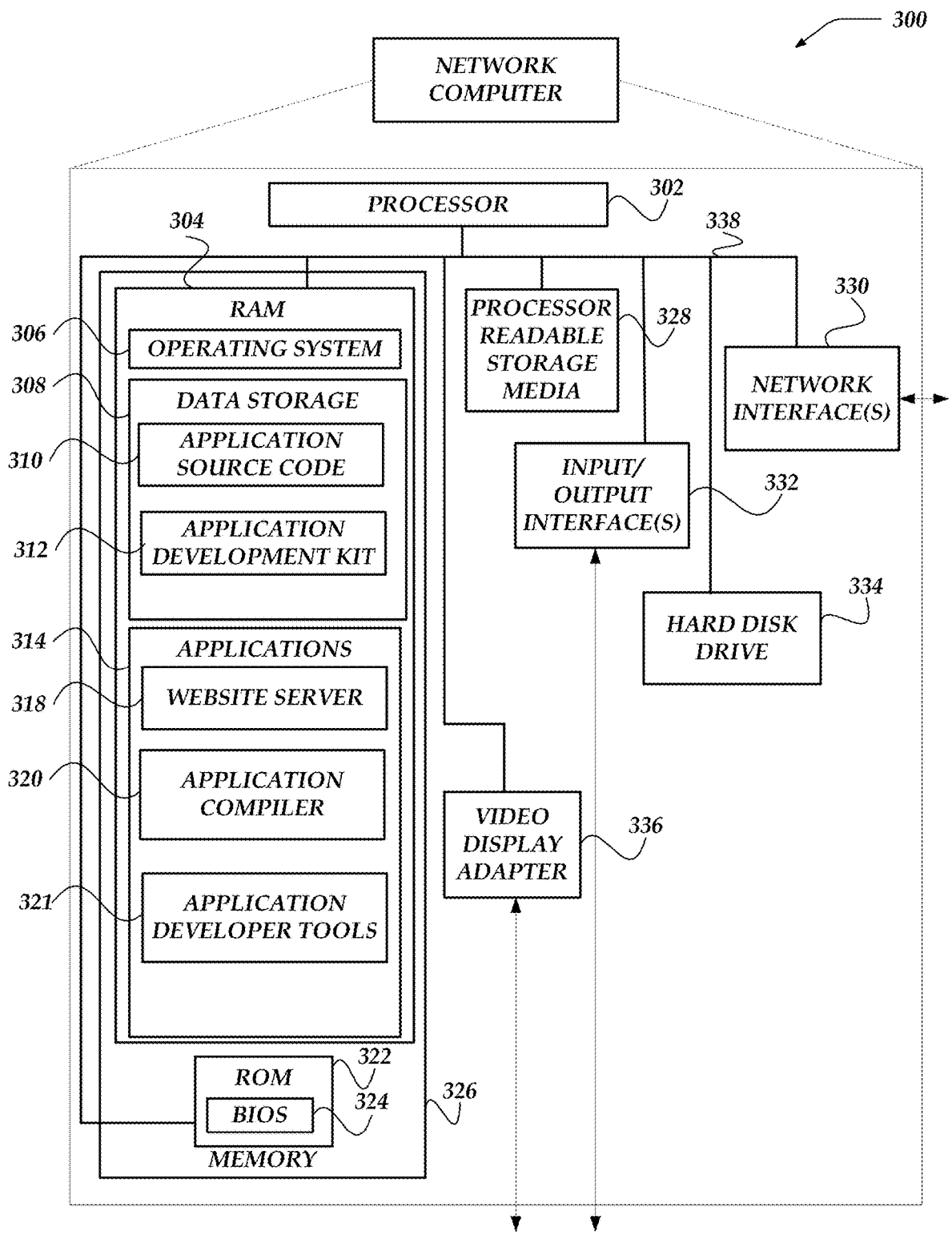
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example Development Computer 116, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include application source code 310. In at least one of the various embodiments, application source code 310 may include information, such as, one or more files, resources, projects, or the like, used for generating executable application. Also, in at least one of the various embodiments, data storage 308 may include, one or more of application development kit 312 representing information and/or tools for generating executable applications, including managed applications, targeted for one or more target platforms.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, application compiler 320 for performing actions for generating executable applications, including managed applications, for one or more target platforms.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical System Architecture

Figure 4:
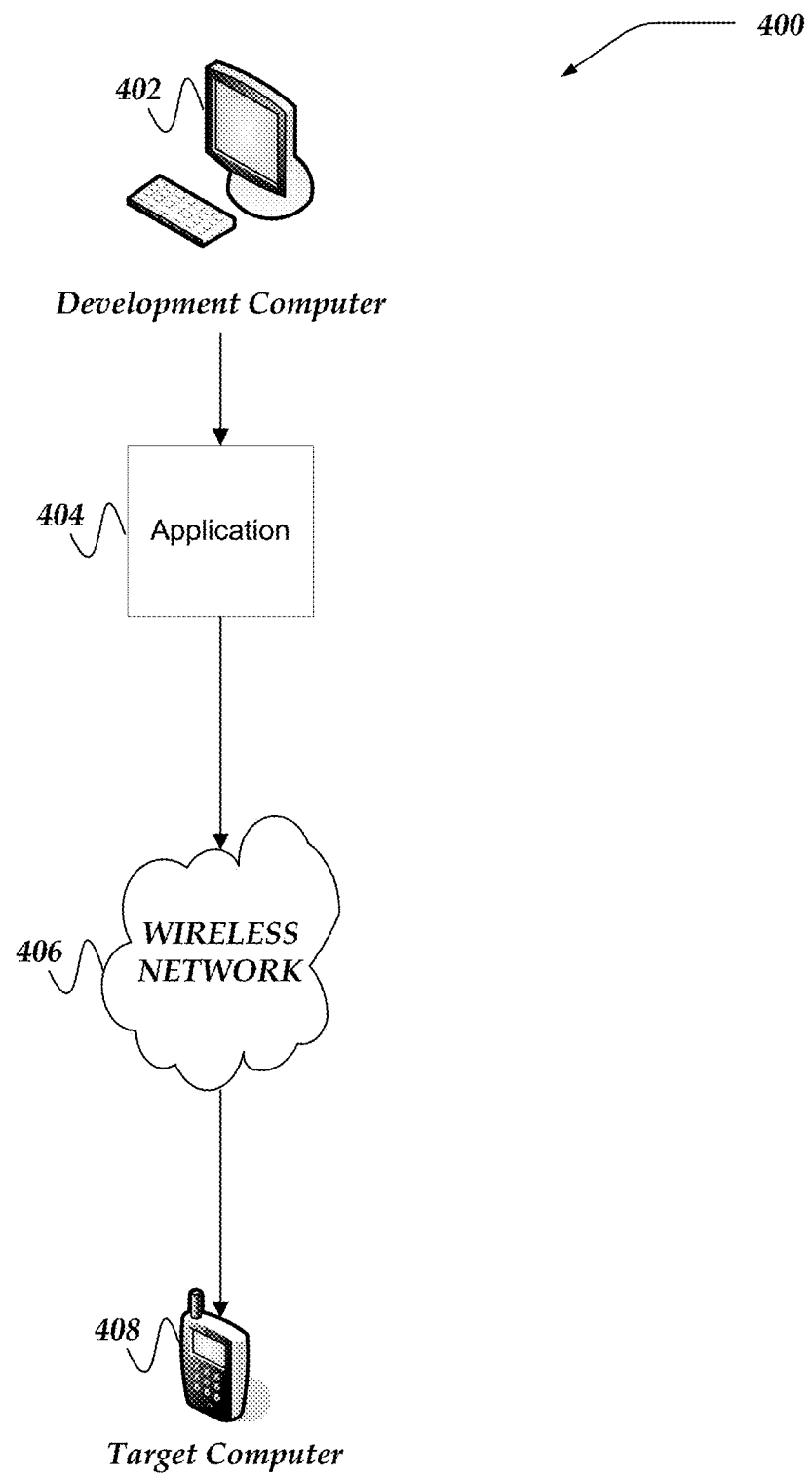
FIG. 4 illustrates a system for generating applications that may manage memory using multiple memory managers, in accordance with at least one of the various embodiments.

FIG. 4 illustrates system 400 for generating applications that may manage memory using multiple memory managers, including at least garbage collection and reference counting, in accordance with at least one of the various embodiments. In at least one of the various embodiments, system 400 comprises components for developing software applications targeted for one or more computers, such as, mobile computers, client computers, game consoles, set-top television boxes, smart televisions, media broadcasting appliances, or the like. In at least one of the various embodiments, system 400 may comprise one or more development computers, such as, development computer 402. In at least one of the various embodiments, development computer 402 may be a network computer or a client computer that is arranged to include tools and facilities that enable software programmers/application developers to create and generate applications for one or more target computers/devices. In at least one of the various embodiments, application developer tools 321 and/or application compiler 320 may be arranged to include one or more of the tools and facilities that enable software programmers to create and generate applications. For example, source code editors, compilers, linkers, software development kits, libraries, user interface design tools, or the like, or combination thereof.

In at least one of the various embodiments, application 404 represents compiled software application that has been generated by a development computer, such as, development computer 402. In at least one of the various embodiments, for this example, application 404 may be considered to be a managed application, that is arranged execute in a managed runtime environment, such as, managed runtime 216.

For example, applications developed using a computer language, or development platform, such as, Java/JVM (Java Virtual Machine), C#/.Net, or the like, may be arranged to be hosted in a managed runtime that performs memory management using its memory management system, such as a garbage collection system for the application when it executes on the target computer. In at least one of the various embodiments, some target computers may manage native memory using a different memory management system, such as, reference counting. Accordingly, differences in the managed runtime's memory management system and the target computer's native memory management system may interfere with or restrict memory management procedures performed by the managed runtime. Typically, target computers having such restrictions may be mobile computers, client computers, smart televisions, game consoles, set-top cable boxes (for televisions), smart home appliances, or the like.

In at least one of the various embodiments, often if an application is ready to be deployed to a target computer, it may be provided to the target computer over a network such as network 406. In at least one of the various embodiments, network 406 may be comprised of one or more networks, such as, network 110 or wireless network 108, or combination thereof.

In at least one of the various embodiments, target computer 408 represents one or more of the various kinds of computers that may be targeted by application 404. As discussed above, such computers may include, mobile computers, client computers, smart televisions, game consoles, set-top cable boxes (for televisions), smart home appliances, or the like.

In at least one of the various embodiments, target computer 408 may be provided application 404 over a network such as network 406. Also, in at least one of the various embodiments, target computer 408 may be provided application 404 using computer readable media, such as, USB thumb drives, memory cards, or the like. Also, for some embodiments, application 404 may be provided to an online application store and/or online application marketplace that enables one or more target computers to download and install the application over a network.

Figure 5:
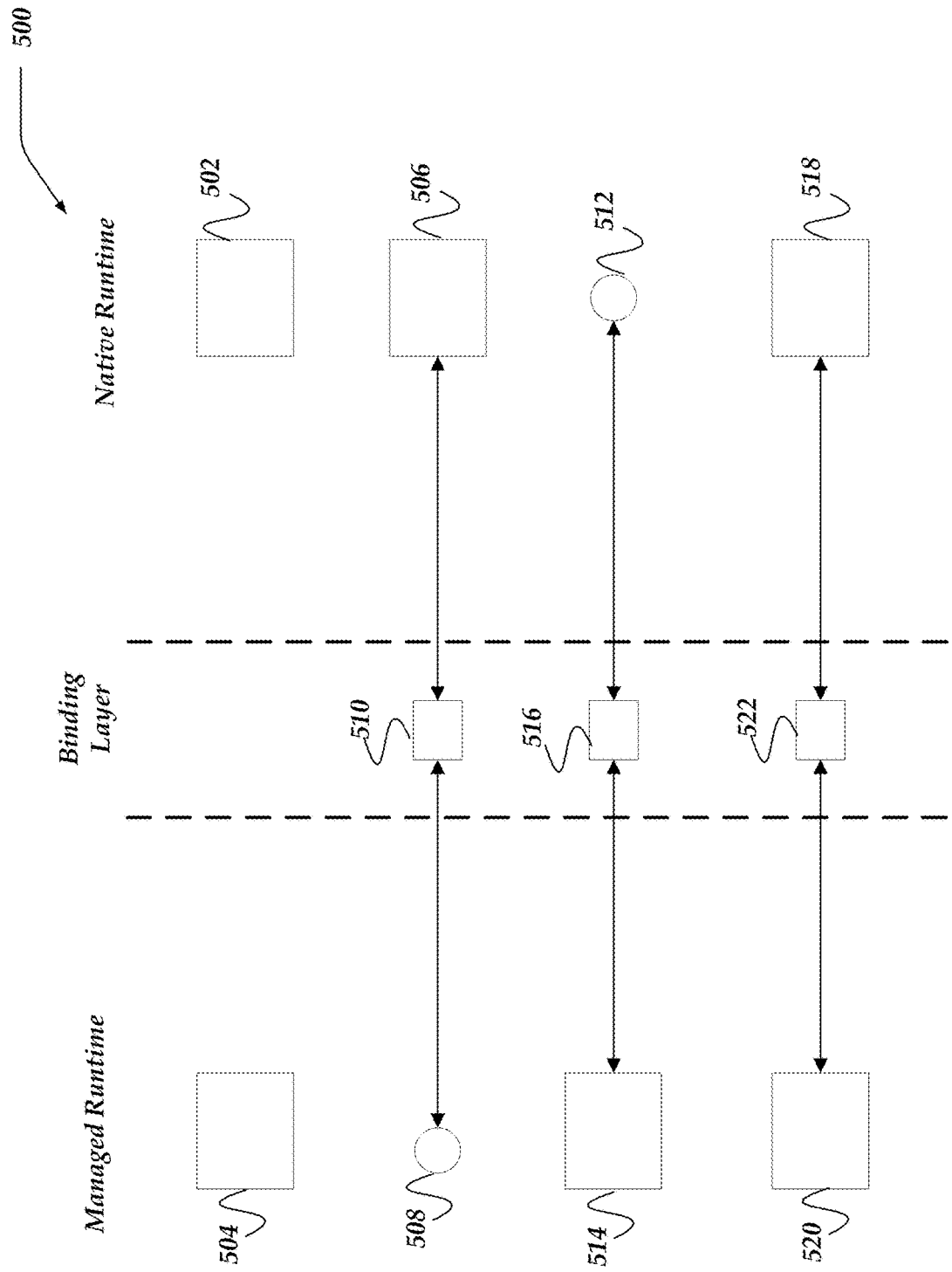
FIG. 5 shows a logical representation of a system that includes two different memory managers in accordance with at least one of the various embodiments.

FIG. 5 shows a logical representation of system 500 that includes two different memory managers in accordance with at least one of the various embodiments. FIG. 5 represents a system (system 500) that may be arranged to have a native runtime environment and a managed runtime environment. In at least one of the various embodiments, object 502 illustrates an object that exist only in the native runtime environment. Accordingly, object 502's memory and/or resources may be managed the native runtime memory manager.

In at least one of the various embodiments, object 504 illustrates a managed object that may exist only in the managed runtime environment. In at least one of the various embodiments, the memory for object 504 may be allocated initially to the managed runtime environment from the native runtime environment, the native runtime environment does not have visibility of object 504. Accordingly, object 504 may be considered a managed object because the memory manager of the managed runtime environment may freely manage object 504 within the managed runtime environment.

In at least one of the various embodiments, object 506 may represent an object that may exist in the native runtime environment and it may be referenced in the managed runtime. Reference 508 illustrates a reference to the native object 506 that is in the managed runtime. Further, binding layer 510 represents the binding code that enables reference 508 to exist in the managed runtime and reference native object 506. Likewise, in at least one of the various embodiments, reference 512 represents native runtime reference to managed object 514. Also, binding code 516 may be arranged to enable the native runtime to reference managed object 514.

In at least one of the various embodiments, native object 518 may represent the native runtime portion of an object while managed object 520 may represent the managed runtime portion. And, in at least one of the various embodiments, binding code 522 may be arranged to enable managed object 520 and native object 518 to interoperate even though they simultaneously represent objects or resources in the manage runtime and the native runtime.

In at least one of the various embodiments, the native runtime environment may be arranged to provide interfaces and/or access to various native environment systems, such as, user-interfaces, networking, stable storage (e.g., file systems), audio, or the like, or combination thereof. Accordingly, the managed runtime may need to access such services through its binding layer. For example, if native object 506 is a native user interface object, such as, a GUI window, reference 508 may be maintained in the managed runtime to enable code from in a managed application to manipulated and/or access the GUI window. Likewise, in at least one of the various embodiments, one or more managed objects that may be referenced by the native objects. Accordingly, the managed runtime, which is hosted in the native runtime needs to be arranged to prevent and/or adapt to how the native runtime manage memory. Otherwise, either the manage runtime may delete objects or the native runtime may delete objects at inopportune times leading to application errors.

In at least one of the various embodiments, the memory managers for the managed runtime and the native runtime may separately perform memory management task for the objects and/or resources that are allocated in their respective domains. In at least one of the various embodiments, the memory manager may apply different strategies and techniques for managing their respective objects. For example, in at least one of the various embodiments, the managed runtime may be arranged to use tracing garbage collection to deallocate memory that may be associated with unused objects. And, for example, a native runtime may be arranged to use reference counting to track if objects may be deallocated. In other embodiments, the managed runtime or the native runtime may employ different or the same memory management schemes, however, there may remain the risk of one runtime environment or the other deletes an object the other is depending on.

For example, in at least one of the various embodiments, if the garbage collection in the managed runtime environment is arranged to deallocate unreachable objects, managed objects, such as, managed object 504, managed object 514, or managed object 520 may be garage collected (and deallocated) unless other managed objects in the managed runtime domain are referencing them. Accordingly, there may be conditions that unless precautions are taken the managed runtime's garbage collector may deallocate managed object, such as, managed object 514 and managed object 520 even through the native runtime is still depending on them to exist. In contrast, managed object 504 is not associated with and/or referenced by the native runtime so it may be deallocated without any concern of causing problems in the native runtime.

Since the managed runtime is hosted in the native runtime environment, the managed runtime may be arranged to accommodate the behavior of the native runtime. Accordingly, the managed runtime's binding layer and memory manager may be arranged to avoid or prevent harmful interactions between the managed runtime's memory manager and the native runtime's memory manager.

In at least one of the various embodiments, the managed runtime may be arranged to expose various native objects that application developers may use in their programs. Further, in at least one of the various embodiments, the binding layer of the managed runtime may be arranged to automatically perform the operations necessary for interactions with the underlying native runtime's memory manager for native objects that may be used in the managed runtime. Accordingly, at when the managed application is executing, the memory manager of the managed runtime may ensure safe interactions with the native runtime's memory manager.

In at least one of the various embodiments, the managed runtime memory manager may generate a garbage collection handle (GC Handle) and associate with it with the peer objects. A GC Handle may be component arranged to be a garbage collection root (GC root) for the peer object. The GC Handle enables the managed runtime's memory manager to track the peer object for the purposes of determining garbage collection operations.

In at least one of the various embodiments, if the native runtime employs reference counting, the binding layer may be arranged to manipulate the reference count of peer objects to ensure that the native runtime memory manager safely handles the memory of the native side of the peer object.

In at least one of the various embodiments, in most cases, the extra processing required for ensuring cross domain memory consistency is hidden from the application developer.

In the source code for a managed application an application developer may instantiate peer objects that are supported by the binding layer that way as they instantiate pure managed object. For example:

```
var mo = new ManagedObject( ); // instantiation of normal managed object
var po = new UIView( ); // instantiation of framework peer object
```

As shown above, the source code for instantiating the peer object, po is the same as instantiating a normal managed object that is unrelated to the native runtime. However, since in this example, the class UIView represents a native user-interface class, additional actions to accommodate the native runtime may be performed. Further, in at least one of the various embodiments, the selection of the particular native runtime objects and services that may be accessible using peer objects in the manage runtime may be selectively implemented by the managed runtime. Accordingly, an application developer may be made aware (through documentation) of the peer objects/services that may be accessed in a managed application that is running in a managed runtime.

In at least one of the various embodiments, depending on the type of peer objects (e.g., user peers, framework peers, or the like) and the operations being performed, various actions, as described below, may be performed by the managed runtime's binding layer and memory manager to maintain safe memory management. For example, the managed runtime's memory manager may look at the peer object's reference count value. This value may report the reference count value of the object as understood by the native runtime.

Accordingly, the managed runtime's memory manager may observe the native runtime's understanding of how many objects, if any, are referencing the object. Thus, if the reference count value indicates that no other objects are referencing the object, the native runtime may be expected to deallocate the object. For example, if deallocating an object in the native runtime would cause instability in the managed runtime, the managed runtime's binding layer and/or memory manager may modify (increase) the native reference count value of the object to prevent the native runtime from deallocating the native object.

In at least one of the various embodiments, the type of actions performed for maintain safe memory interoperability may depend of the type of peer object. In at least one of the various embodiments, framework peer objects may be instantiations of objects that are completely defined in the native runtime. Accordingly framework peers may be considered objects that exactly mirror their correspondent native objects. Also, the internal state of the framework peer may be maintained in the native runtime.

In contrast, user peers may be objects that have definitions that derive from a native class/definition. User peers may be treated differently than framework peers because the user peers may be customized such that the user peers may maintain state within the managed runtime as well as state in the native runtime. The customized, non-native portions of the user peers may be maintained by the managed runtime. Whereas, the framework peers do not have non-native internal state.

In at least one of the various embodiments, if the reference count value corresponding to user peer becomes one, any strong reference GC Handle may be removed/destroyed and in its place a weak reference GC Handle may be created. Accordingly, in at least one of the various embodiments, if a user peer object is created in a managed application, the native runtime reference count for the native side of the object will be one, resulting in a weak reference GC Handle being created and associated with the user peer object. In at least one of the various embodiments, if a user peer's native reference count is greater than one, the weak reference GC Handle may be destroy and a strong reference GC Handle may be created.

In at least one of the various embodiments, a GC Handle object or data structure may be implemented such that it may conditionally be used as weak reference GC Handle or a strong reference GC Handle. For example, the GC Handle data structure may include a flag or property that may be used to control/determine if the GC Handle may be a strong reference or a weak reference.

In at least one of the various embodiments, the actions taken for handling framework peers may vary depending on whether there is a backing field set for the framework peer. In at least one of the various embodiments, if a framework peer is created, a weak reference GC Handle may be created for the framework peer. In at least one of the various embodiments, if a backing field is set during the execution of a managed application, the reference count value for the framework peer may be obtained to determine which actions to take.

In at least one of the various embodiments, if a backing field has been set and the reference count value of the framework peer is one, remove/destroy any strong reference GC Handle and create a weak reference GC Handle for the framework peer. Alternatively, in at least one of the various embodiments, if the reference count value goes above one, remove/destroy the weak reference GC Handles and create a strong reference GC Handle to framework peer.

In at least one of the various embodiments, GC Handles may be arranged to be roots (GC Roots) in the managed runtime's garbage collector. In at least one of the various embodiments, weak reference GC Handles may be GC Roots that are not traced during garbage collection. Accordingly, managed objects referenced by managed peers associated with weak reference GC Handles may be garbage collected unless they can be traced from other objects. In contrast, strong reference GC Handles may be considered first class GC Roots such that they are traced during garbage collection. Accordingly, managed objects reference by managed associated with strong reference GC Handles will not be garbage collected.

In at least one of the various embodiments, functionality for managing the interoperation of the managed runtime memory manager and the native runtime memory manager may be described using the following examples. For brevity and clarity these examples are illustrated using pseudo code written in a C# object-oriented style. One of ordinary skill in the art will appreciate that the innovations described herein may be implemented using other computer programming languages as well as other data structures, class definitions, method/function names, or the like.

In some embodiments, managed peers may be designed to have an object-oriented class hierarchy that mirrors the native class hierarchy. Accordingly, methods may be added to the managed peer for support memory management interoperability. For example, in at least one of the various embodiments, the base class for managed peers may be defined as follows:

```
class NSObject {
    public NSObject ( ) {
        AddWeakGCHandle (this);
    }
}
```

Methods for obtaining and manipulating the native reference count from the managed runtime may be defined as well:

```
public override int Retain ( ) {
    int reference_count = base.Retain ( );
    if (reference_count == 2) {// this means it went from 1 to 2
        RemoveWeakGCHandle (this);
        AddStrongGCHandle (this);
    }
    return reference_count;
}
public override void Release ( ) {
    base.Release ( ); //this calls into the native release method
    int reference_count = base.RetainCount ( ); //this call into the native retainCount method
```

```
    if (reference_count == 1) {// this means it went from 2 to 1
        RemoveStrongGCHandle (this);
        AddWeakGCHandle (this);
    }
}
```

In at least one of the various embodiments, the binding layer may be arranged to determine the native reference count value for peer object when the managed runtime memory manager executes a garbage collection cycle. Accordingly, in at least one of the various embodiments, to detect that a backing field of a framework peer has been modified, the binding layer of the managed runtime may be arranged to track when a backing field is set during the execution of a managed application. For example:

```
NSObject _mt_weakdelegate;
public NSObject WeakDelegate {
    set {
        mt_weakdelegate = value;
        SetNativeProperty (this, "delegate", value);
        MarkObjectForNRC ( );
    }
    get {
        return GetNativeProperty (this, "delegate");
    }
}
```

In this example, for at least one of the various embodiments, each time a weak delegate property/field may be set on a framework peer a binding layer/memory manager function may be called to perform one or more actions to support the interoperation of the managed runtime memory manager and the native runtime memory manager.

For example, above the function MarkObjectForNRC may be defined to support native runtime reference counting:

```
private void MarkObjectForNRC ( ) {
    if (this.is_registered)
        return;
    this.is_registered = true;
    RegisterWithGarbageCollector (this);
}
```

In this example, the managed peer that has had a backing field set is marked for additional processing by registering it with the garbage collector of the managed runtime memory manager. In this example, the processing of the peer's GC Handles may be deferred until a future garbage collection cycle. In other embodiments, the manipulation of the managed peer's GC Handles may occur at the time the backing field is set rather than waiting until garbage collection occurs.

In at least one of the various embodiments, if the managed runtime memory manager executes a garbage collection cycle, it may process the registered managed peer object as needed. For example, a garbage collector may execute the following:

```
static void ProcessRegisteredObject ( ) {
    foreach (NSObject object in registered_framework_objects)
    {
        if (object.RetainCount > 1) {
```

```
            RemoveWeakGCHandle (object);
            AddStrongGCHandle (object);
        } else {
            RemoveStrongGCHandle (object);
            AddWeakGCHandle (object);
        }
    }
}
```

In the example shown above, if the managed peer has a native reference count value that is greater than one, the garbage collector may remove weak reference GC Handle and add a strong reference GC Handle; otherwise, the garbage collector may remove the strong reference GC Handle and add a weak reference GC Handle.

The following examples describe problematic scenarios that may be addressed by at least one of the various embodiments.

Use Case 1: If a user peer is referenced by native runtime object/code, the user peer may be prevented from being garbage collected by the memory manager of the managed runtime.

```
class MyView : UIView { }
var v = new UIView ( ); //reference count starts at 1
SetRootView (v); //native call that increases the reference
count to 2
```

In this example, after the call to a native function, (SetRootView), the framework peer object v is no longer referenced by managed code. Meaning, there are no longer any other managed objects in the managed application that are referencing the v. So it would normally be available to be garbage collected by the managed runtime memory manager. However, the call to the native function will trigger the native runtime to increment the reference count value for v. Accordingly, the managed runtime memory manager may observe the change of the reference count value and will create a strong reference GC Handle. The presence of the strong reference GC Handle will ensures that v does not get deallocated by the Garbage Collector. Also, in at least one of the various embodiments, the binding layer code associated with the native peer function calls may register the managed peer with the memory manager so it may be processed appropriately before garbage collection.

Use Case 2: if a weak referenced property/field of a framework peer is set and then referenced from the native runtime, the target of the weak referenced property must be prevented from being garbage collected by the managed runtime's memory manager.

```
class MyDelegate : NSObject { }
var d = new MyDelegate ( ); //reference count starts at 1
var v = new UIView ( ); //reference count starts at 1
v.WeakDelegate = d; //reference count of d doesn't change
since it's a weak property
SetRootView (v); //native call that increases the
reference count to 2
```

In this case, as the weak property is set a corresponding backing field may be set and as shown above, the object, v may be registered with managed runtime's memory manager to receive additional processing in the next garbage collection cycle. Accordingly, at garbage collection time, the managed runtime's Garbage Collector will test the reference count value for v. Since, the reference count value for v will be greater than one, a strong GC Handle will be created for the framework object. Since v has a backing field pointing to d, the Garbage Collector will keep both objects alive during garbage collection; otherwise the delegate d would be always collected (deallocated) and not be present to handle events on the view v if they occur they happen.

Use Case 3: a framework peer has a weak property field that is set. Both objects should be collected. This is an example is similar to Use Case 2, except the call to the native runtime function (SetRootView) is omitted.

```
class MyDelegate : NSObject { }
var d = new MyDelegate ( ); //reference count starts at 1
var v = new UIView ( ); //reference count starts at 1
v.WeakDelegate = d; //reference count of d doesn't
change since it's a weak property
```

In this example, the assignment of a value to the weak property of the framework peer will trigger the framework peer v to be registered with the memory manager for further. Accordingly, at garbage collection time, the Garbage Collector will check v and see a reference count of one, thus creating a weak GC Handle to it. Since no other objects are referencing v, the Garbage Collector will deallocate both v and d.

In at least one of the various embodiments, in all of these use cases if the peer object is referenced by another managed object in the managed application, that peer object will not be collected by the managed runtime garbage collector since there is a managed object referencing it.

Figure 6:
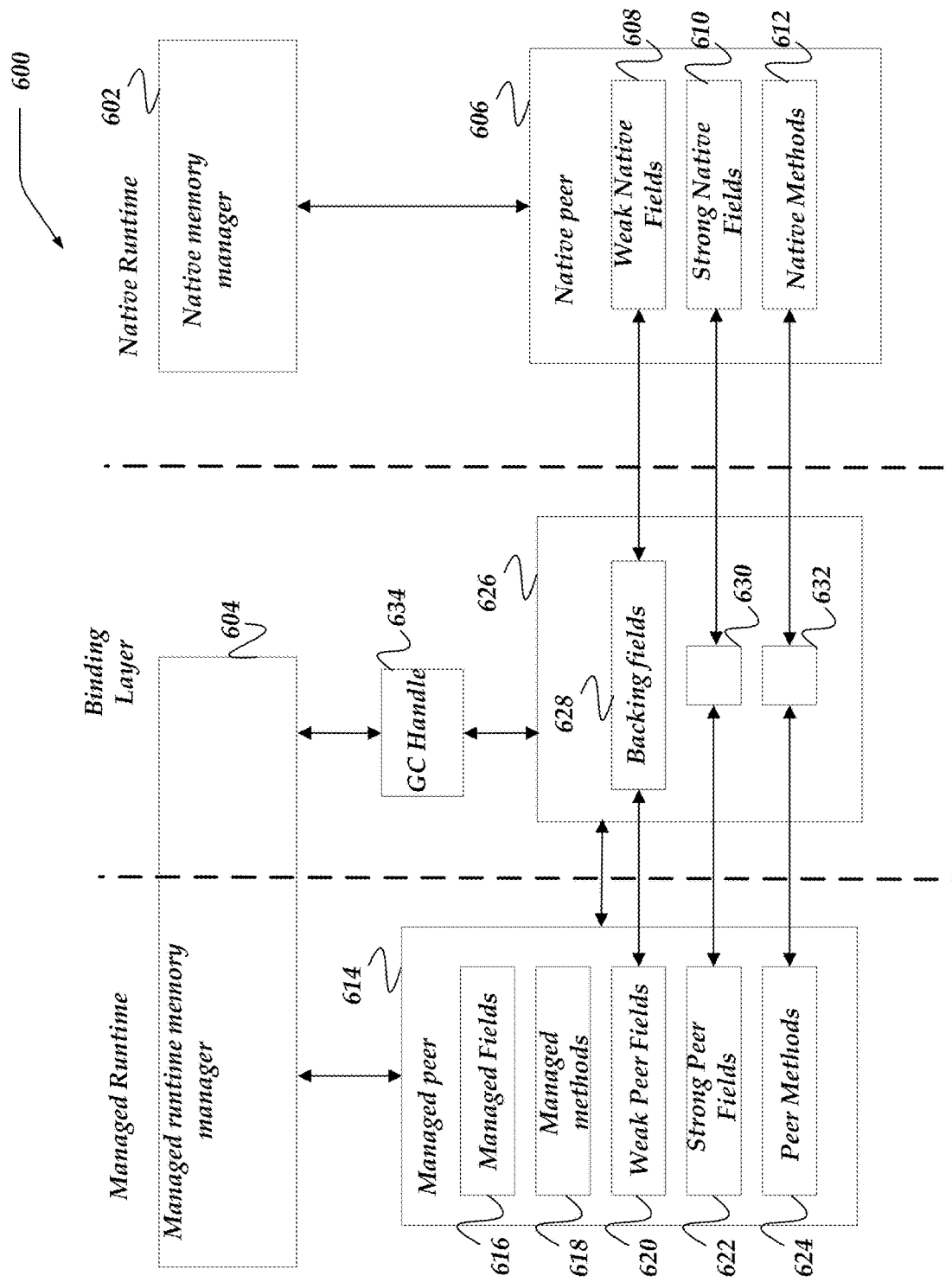
FIG. 6 illustrates a logical architecture of a system for managing memory using multiple memory managers during runtime in accordance with at least one of the various embodiments.

FIG. 6 illustrate a logical architecture of system 600 for managing memory using multiple memory managers during runtime in accordance with at least one of the various embodiments. System 600 is one example of a managed peer/native peer pair such as those described above. It is presented as a non-limiting illustrative example to clarify the description of the innovations included herein. Similar to system 500, system 600 comprises a managed runtime, native runtime and a binding layer that enables interoperation between the runtimes. The native runtime includes native memory manager 602. In at least one of the various embodiments, native memory manager 602 may be arranged to use reference counting for managing native objects. Native peer 606 is a native peer object that is a native object executing in the native runtime. Here native peer 606 may be referred to as a peer object because it is paired with a corresponding object that is operative in managed application that may execute in the managed runtime.

In at least one of the various embodiments, native peer 606 may be comprised of code and data information that implements the functionality of the native object. In this example, native peer 606, includes, weak reference native fields 608, strong reference native fields 610, and native methods (functions) 612. In this example, the native runtime supports weak reference fields and strong reference fields. One of ordinary skill in the art will be familiar with weak reference semantics and strong reference semantics. In brief, assigning an object to a weak reference field does not increment the assigned object's reference count value.

In at least one of the various embodiments, the manage runtime may comprise managed runtime memory manager 604. In at least one of the various embodiments, memory manager 604 may be arranged to implement garbage collection for the managed runtime. In at least one of the various embodiments, a component of memory manager 604 may be a garbage collector arranged to execute tracing garbage collection.

Managed peer 614 may be a managed peer object that is paired with native peer 606. Managed peer 614 is a managed object that corresponds to native peer 606. In at least one of the various embodiments, managed peer 606 may comprise, managed fields 616, managed methods 618, weak reference peer fields 620, strong reference peer fields 622, peer methods 624, or the like.

In at least one of the various embodiments, managed fields 616 and managed methods 618 represent data and code that implements portions of managed peer 614 that are not directly associated with the native runtime and native peer 606. Referring the discussion above, managed peer 614 may be considered a user peer since it may extend the functionality of its paired native peer. In contrast, a framework peer would omit managed fields and managed methods while implementing weak peer field, strong peer fields, and peer methods.

In at least one of the various embodiments, weak peer fields 620 are managed runtime interfaces that enable access to corresponding weak reference native fields. Likewise, in at least one of the various embodiments, strong peer fields 622 enable a managed application to access corresponding strong reference native fields of native peer 606. And, in at least one of the various embodiments, peer methods 624 enables a managed application to access the corresponding native methods of native peer 606.

In at least one of the various embodiments, to enable the managed peers and native peers to interoperate, a binding layer may be arranged to include instructions and data for crossing the boundary between the managed runtime and the native runtime. A managed runtime may be arranged to import one or more functions, interfaces, data types, or the like, from native runtime it is hosted in. For examples, Java Runtimes may employ Java Native Interface (JNI) for interoperating with a native runtime. Likewise, .Net managed environments may employ DLLImport to interoperating in a windowed (e.g. Microsoft Windows) environment. The particular interoperation facility for accessing features, interfaces, and objects, of a particular native runtime will vary depending on the platform and depending on the type feature being accessed.

In at least one of the various embodiments, binding object 626 represents a portion of a binding layer that enables managed peer 614 and native peer 606 to interoperate in the managed runtime and the native runtime. In at least one of the various embodiments, each managed peer may be associated with one or more binding layer objects and/or data. In at least one of the various embodiments, the association of the managed peer object to the binding layer may be hidden from the managed application developer. The binding layer enables the necessary data and instructions for performing the interoperation to occur without direct intervention of the application developer.

In at least one of the various embodiments, binding object 626 may comprise, backing fields 628. In at least one of the various embodiments, backing fields may be used to mirror weak reference fields of a native peer. As described above, setting weak reference fields of a managed peer from a managed application require special handling as described above.

In at least one of the various embodiments, pass-through bindings, such as pass-through binding 630, and pass-through binding 632 represent using the particular interoperation facility to exchange data from the managed runtime to the native runtime. In at least one of the various embodiments, pass-through bindings may provide various interoperability features for the native runtime platform, such as, data marshaling, parameter ordering, data byte order (big endian vs. little ending), or the like. The details will vary depending on the needs of the particular native runtime environment.

In at least one of the various embodiments, GC Handle 634 represents a GC Handle (weak or strong) that may be associated with managed peer 626. In at least one of the various embodiments, GC Handle 634 may be part of managed peer 614 rather than binding object 626 without limiting or varying the scope of these innovations. Here it shown as being linked to binding object 626 but could be directly linked to managed peer 614. As described, above, GC Handle 634 may represent the GC root associated with managed peer 614, and depending on the circumstances it may be a strong reference GC Handle, or a weak reference GC Handle.

Generalized Operations

FIGS. 7-10 represent the generalized operations of managing memory using multiple memory managers during runtime in accordance with at least one of the various embodiments. In at least one of the various embodiments, processes 700, 800, 900, and 1000 described in conjunction with FIGS. 7-10 may be implemented by and/or executed on a single network computer, such as network computer 300 of FIG. 3. In other embodiments, these processes or portions of process thereof may be implemented by and/or executed on a plurality of network computers, such as network computer 300 of FIG. 3. Also, in at least one of the various embodiments, processes 700, 800, 900, and 1000 may be performed by a target computer, including, mobile computers, smart phones, client computers, smart televisions, game consoles, set-top cable boxes (for televisions), smart home appliances, or the like, such as, client computer 200. Further, in at least one of the various embodiments, the processes described in conjunction with FIGS. 7-10 may be operative in architectures such as those described in conjunction with FIGS. 4-6.

Figure 7:
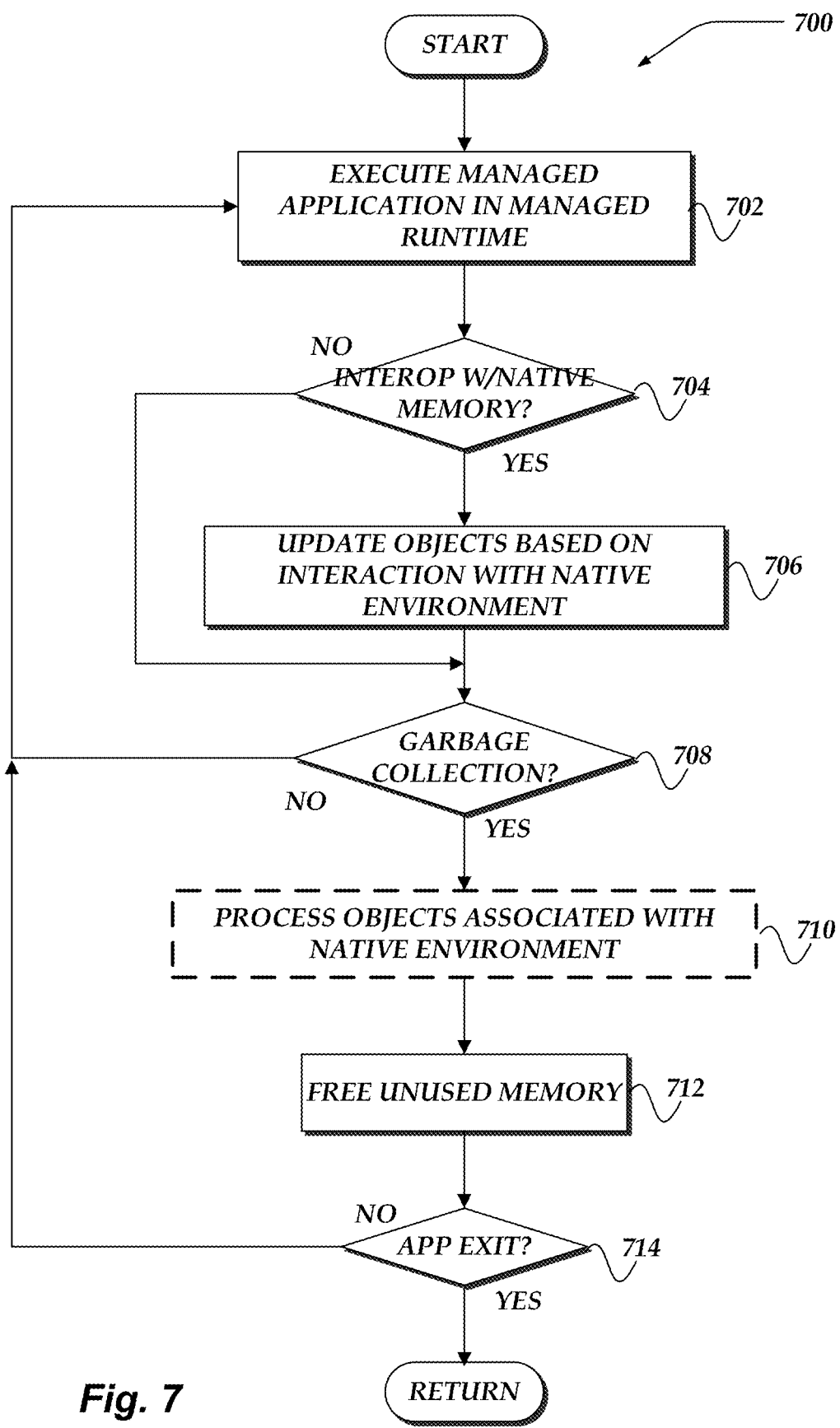
FIG. 7 shows an overview flowchart for a process for managing memory using multiple memory managers during runtime in accordance with at least one of the various embodiments.

FIG. 7 shows an overview flowchart for process 700 for managing memory using multiple memory managers during runtime in accordance with at least one of the various embodiments. After a start block, at block 702, in at least one of the various embodiments, a managed application may be executing in a managed runtime. At decision block 704, in at least one of the various embodiments, if the managed application is interoperating with the native runtime, control may flow to block 706; otherwise, control flows to decision block 708. At block 706, in at least one of the various embodiments, the memory objects/resources associated with the interaction with the native runtime environment may be updated. At decision block 708, in at least one of the various embodiments, if the managed runtime's managed manager is ready to initiate garbage collection, control may flow to block 710; otherwise, control may loop back to block 702. At block 710, optionally, in at least one of the various embodiments, the managed runtime's memory manager may process one or more registered manage peer objects that may be associated with the native runtime environment. At block 712, in at least one of the various embodiments, the managed memory manager may free memory that may be unassociated with an active used object. At decision block 714, if the managed application has finished executing, control may be returned to a calling process; otherwise, control may loop back to block 702.

Figure 8:
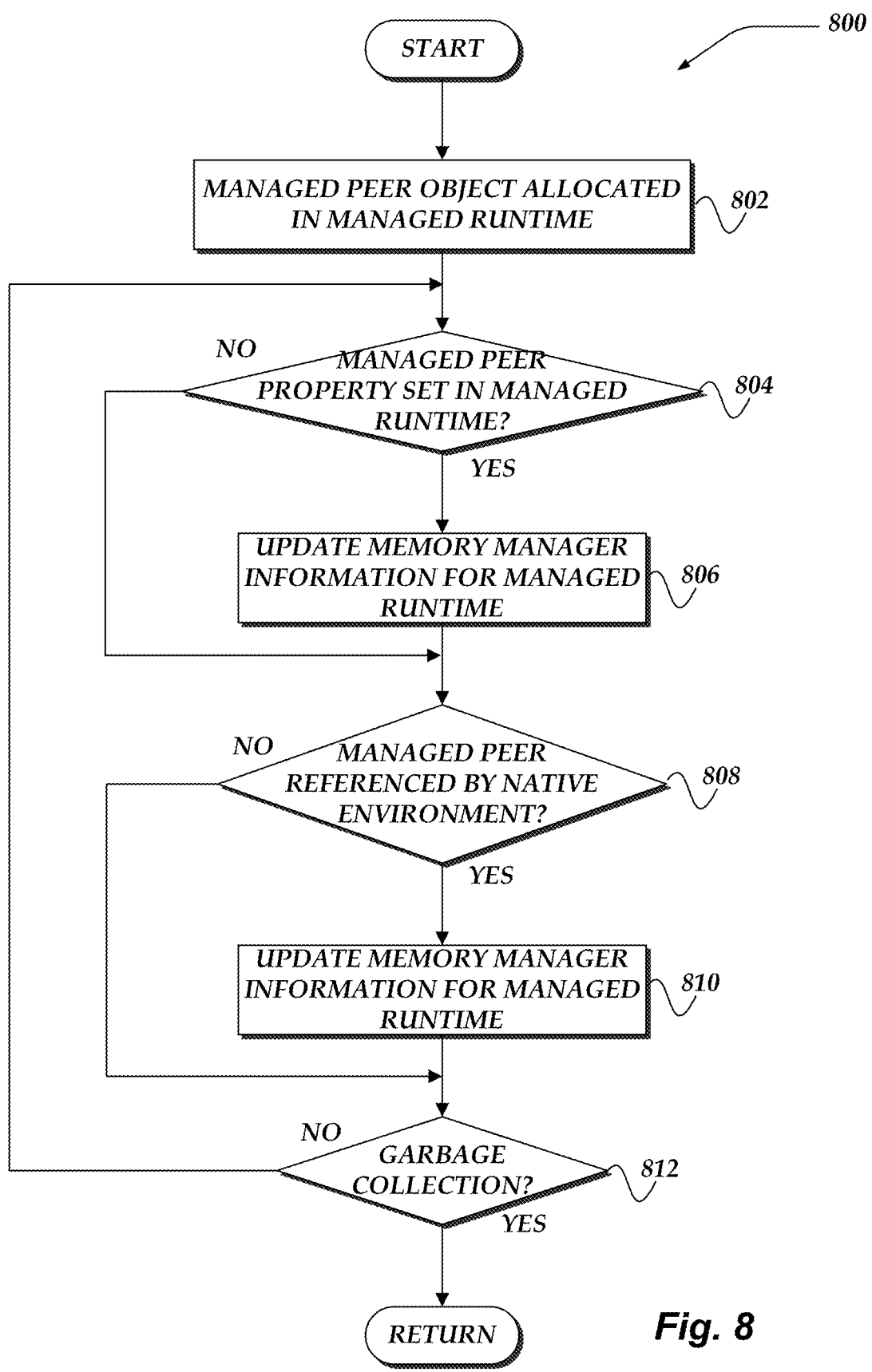
FIG. 8 shows an overview flowchart for a process for managing memory using multiple memory managers during runtime in accordance with at least one of the various embodiments.

FIG. 8 shows an overview flowchart for process 800 for managing memory using multiple memory managers during runtime in accordance with at least one of the various embodiments. After a start block, at block 802, a managed application executing in the managed runtime may allocate a managed peer object. As described in detail above, the managed peer object may correspond to a native object in the native runtime environment that may be hosting the managed runtime.

In at least one of the various embodiments, such allocation may occur anywhere or anytime the executing managed application allocates one or more of the managed peers. The set of available managed peer objects may vary depending on the native runtime platform and the particular implementation of managed application.

At decision block 804, in at least one of the various embodiments, if a property field of the managed peer object is set (assigned to) from within the managed application, control may flow to block 806; otherwise, control may flow to decision block 808.

At block 806; in at least one of the various embodiments, the managed runtime memory manager and/or the binding layer may update the memory status of the managed peer as described above. In at least one of the various embodiments, if the field is a weak reference field corresponding to a weak native field the memory manager or the binding layer may register the managed peer object to receive additional processing during a garbage collection.

At decision block 808, in at least one of the various embodiments, if the managed peer is referenced by the native runtime environment, control may flow to block 810; otherwise, control may flow to decision block 812. In at least one of the various embodiments, this condition describes calling a function in the managed application that corresponds to a native function where a reference to the managed peer is passed as a parameter. The assumption is that the binding layer may marshal the reference of the managed peer to the native runtime environment where its corresponding native object may be acted upon based on the native version of the called function At block 810, in at least one of the various embodiments, the managed runtime memory manager and/or the binding layer may update the memory status of the managed peer as described above. In at least one of the various embodiments, the call to a method or function that enables to the native runtime to use the native peer side of the managed peer to perform some actions, e.g., displaying a window on a user-interface, the managed runtime will want to make that the managed peer is not garbage collected while the native runtime may still be using it.

At decision block 812, in at least one of the various embodiments, if the managed runtime determines that it is time for garbage collection, control may be returned to a calling process; otherwise, control may loop back to decision block 804. In at least one of the various embodiments, various conditions may cause a garbage collection event to occur. For example, the amount of memory available to allocate, expiration of a timer, express instruction from a running managed application, or the like, or combination thereof.

Figure 9:
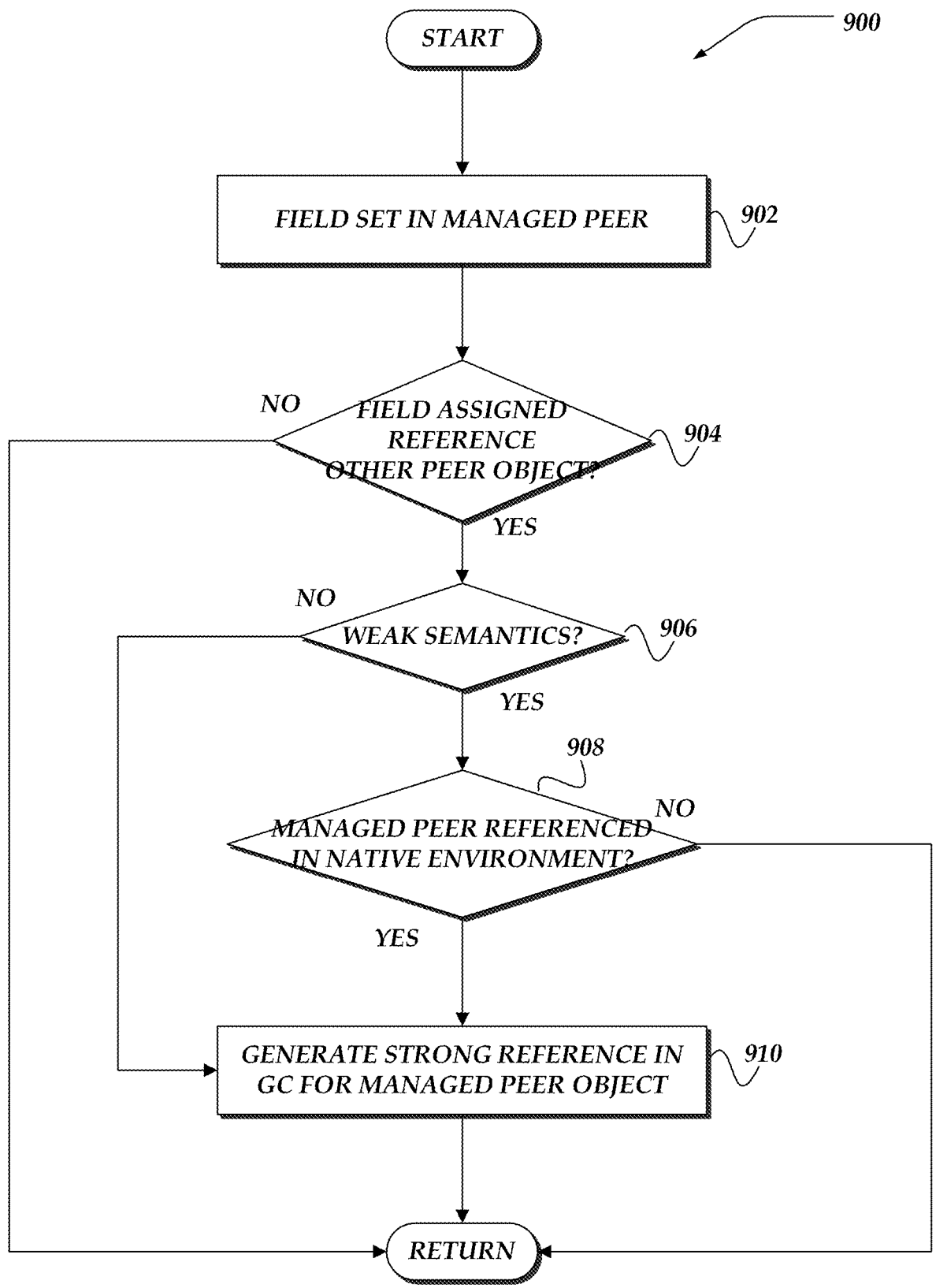
FIG. 9 shows an overview flowchart for a process for setting a property in a peer object in accordance with at least one of the various embodiments.

FIG. 9 shows an overview flowchart for process 900 for setting a property in a managed peer object in accordance with at least one of the various embodiments. After a start block, at block 902, in at least one of the various embodiments, a field (or property) in a managed peer may be set during the execution of a managed application. In at least one of the various embodiments, this typically will be an assignment of a reference or value to a property field of the managed peer object.

At decision block 904, in at least one of the various embodiments, if the field is assigned a reference to another managed peer object, control may flow decision block 906; otherwise, control may be returned to a calling process.

At decision block 906, in at least one of the various embodiments, if the assigned field on the managed peer object is governed by weak semantics, control may flow to decision block 908; otherwise, control may flow to block 910. In at least one of the various embodiments, the managed peer object may be associated with native objects that are defined to have properties and/or fields that are implemented as weak references. Accordingly, in at least one of the various embodiments, the managed peer object may be implemented to have weak reference fields as well.

At decision block 908, in at least one of the various embodiments, if the managed peer that includes the field that was set is referenced by the native runtime environment, control may flow block 910; otherwise, control may be returned to a calling process. For example, in at least one of the various embodiments, passing a reference of a managed peer as parameter to a function that corresponds to a native function may be assumed to cause a condition in the native runtime environment that require the passed in managed peer to be retained during garbage collection.

At block 910, in at least one of the various embodiments, the managed runtime's memory manager may generate a strong reference to managed peer in the garbage collection. In at least one of the various embodiments, the memory manager may be arranged to remove and weak GC Handle associated with the managed peer and generate a strong GC Handle in its place. In at least one of the various embodiments, as further described below, associating a strong reference GC Handle with the managed peer object may ensure that the managed peer object will be retained during a garbage collection event. Next, control may be returned to a calling process.

Figure 10:
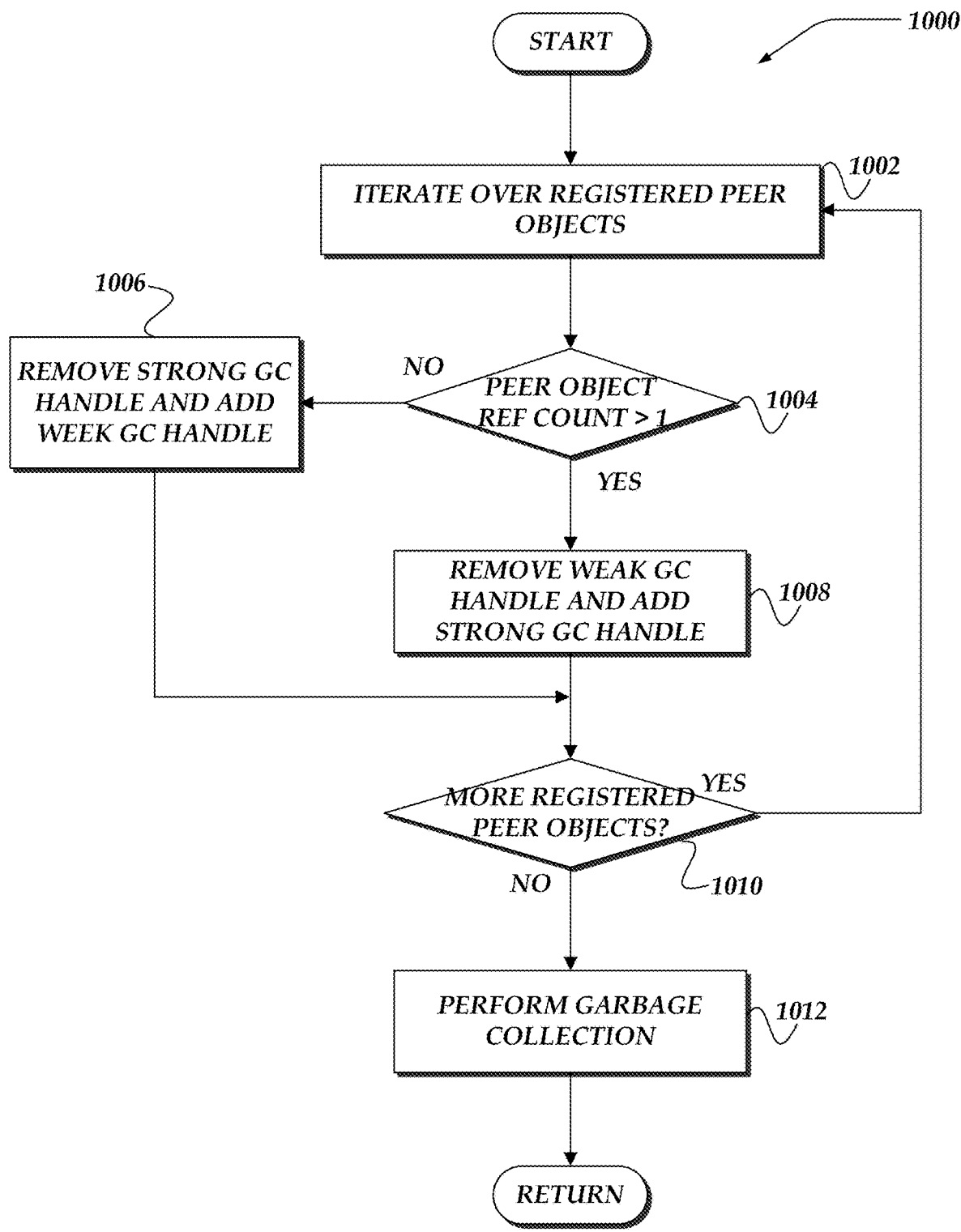
FIG. 10 shows an overview flowchart for a process for performing garbage collection in accordance with at least one of the various embodiments.

FIG. 10 shows an overview flowchart for process 1000 for performing garbage collection in accordance with at least one of the various embodiments. After a start block, at block 1002, in at least one of the various embodiments, the managed runtime's memory manager may iterate over one or more managed peer objects that have been registered with the memory manager. As described above, managed peers may be registered with the garbage collector if they may require special handling. For example, if an interaction in the managed application with the managed peer causes the native peer to have its reference count value increased, the managed peer may be registered with the garbage collector to receive further processing before garbage collection occurs.

At decision block 1004, in at least one of the various embodiments, if a managed peer reports a native peer having a native runtime reference count value greater than one, control may flow to block 1008; otherwise, control may flow to block 1006. In at least one of the various embodiments, binding layer code may enable the managed runtime to request the native runtime reference count value for the native peer corresponding to the managed peer. If the reference count value is more than one, the memory manager may be assured that a native system, service or object, is depending on the managed peer and native peer existing.

At block 1006, in at least one of the various embodiments, since the native runtime reference count value is one, the memory manager may remove the strong reference GC Handle and add a weak reference GC Handle. In at least one of the various embodiments, the same GC Handle may be arranged to operate as a strong reference GC Handle or a weak reference GC Handle. In such cases, the memory manager may perform actions to enable the GC Handle to perform in the appropriate mode. For example, in at least one of the various embodiments, a status flag or tag may be set on the GC Handle to indicate if it is a strong reference GC Handle or a weak reference GC Handle.

In at least one of the various embodiments, a reference count value of one may indicate that no native objects in the native runtime depend on the managed peer. Accordingly, if the managed peer is not referenced by another managed object it may be freely garbage collected.

At block 1008, in at least one of the various embodiments, the memory manager may remove the weak reference GC Handle from the manager peer and add a strong reference GC Handle. In at least one of the various embodiments, the same GC Handle may be arranged to operate as a strong reference GC Handle or a weak reference GC Handle. In such cases, the memory manager may performs actions to enable the GC Handle to perform in the appropriate mode. For example, in at least one of the various embodiments, a status flag or tag may be set on the GC Handle to indicate if it is a strong reference GC Handle or a weak reference GC Handle.

At decision block 1010, if there are more registered managed peer objects to process, control may look back to block 1002; otherwise, control may flow to block 1012. In at least one of the various embodiments, each registered managed peer object may be checked before other garbage collections processes, such as, as tracing occur.

In at least one of the various embodiments, the binding layer may check the native runtime reference count value of the manager peer object each time and/or at the time a triggering interaction occurs. And, modify the GC Handles accordingly. For example, if a managed peer's weak reference field is set during execution of the managed application, the binding layer may immediately check the native runtime reference count value for the managed peer and take action accordingly.

At block 1012, in at least one of the various embodiments, since all of the registered managed peer objects have been processed, the managed runtime's memory manager may perform garbage collection. In at least one of the various embodiments, during garbage collection managed peers that are associated with a strong reference GC Handle may be retained (not garbage collected and deallocated). Also, in at least one of the various embodiments, the garbage collector may trace the strong GC Handle to identify other managed objects that its corresponding managed peer object may be referencing. Such traced objects may also retained because they are traced to strong GC Handle.

In at least one of the various embodiments, managed peers associated with a weak reference GC Handle that is not referenced by another managed object may be garbage collected and/or deallocated. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing memory of a computer, wherein the computer performs actions, including:
   providing one or more peer objects that correspond to one or more native objects that are executing in a native runtime environment, wherein memory is allocated for the one or more peer objects;
   generating, in a binding layer that enables a reference to exist in a native runtime environment and reference one of the one or more managed objects, and a reference to exist in a managed runtime environment and reference one of the one or more native objects, the binding layer including one or more binding objects that enable one or more managed objects to interoperate with one or more native objects, one or more managed objects associated with one or more binding objects, one or more garbage collection handles associated with the one or more peer objects, one or more binding objects including backing fields to mirror weak reference fields; and
   when an application executes one or more instructions that interact with the one or more peer objects and the native runtime environment, modifying each garbage collection handle associated with the one or more peer objects based on a type of an interaction; and
   when a garbage collection event occurs, deallocating memory for the one or more peer objects based in part on its modified garbage collection handle.

2. The method of claim 1, further comprising executing the application in the managed runtime environment.

3. The method of claim 1, further comprising employing a memory manager to register the one or more peer objects in the managed runtime environment.

4. The method of claim 1, wherein the memory allocated for the one or more peer objects is managed by a memory manager in the managed runtime environment that is separate from another memory manager that manages memory for the one or more native objects executing in the native runtime environment.

5. The method of claim 1, further comprising, when the type of interaction is an assignment of another peer object to a weak peer field of a peer object, modifying the peer object's garbage collection handle to become a strong reference garbage collection handle.

6. The method of claim 1, wherein deallocating memory for the one or more peer objects, further comprises, retaining the memory for the one or more peer objects that are associated with a strong reference garbage collector handle.

7. A system for managing memory for a computer, comprising:
the computer, including:
a transceiver that communicates over a network;
a memory that stores at least instructions; and
a plurality of processors, wherein one or more processors execute instructions that enable actions, including:
providing one or more peer objects that correspond to one or more native objects that are executing in a native runtime environment, wherein memory is allocated for the one or more peer objects;
generating, in a binding layer that enables a reference to exist in a native runtime environment and reference one of the one or more managed objects, and a reference to exist in a managed runtime environment and reference one of the one or more native objects, the binding layer including one or more binding objects that enable one or more managed objects to interoperate with one or more native objects, one or more managed objects associated with one or more binding objects, one or more garbage collection handles associated with the one or more peer objects, the one or more binding objects including backing fields to mirror weak reference fields; and
when an application executes one or more instructions that interact with the one or more peer objects and the native runtime environment, modifying each garbage collection handle associated with the one or more peer objects based on a type of an interaction; and
when a garbage collection event occurs, deallocating memory for the one or more peer objects based in part on its modified garbage collection handle; and
a development computer, including:
a transceiver that communicates over the network;
a memory that stores at least instructions; and
one or more processors that execute instructions that enable actions, including:
compiling a machine code version of the application.

8. The system of claim 7, further comprising executing the application in the managed runtime environment.

9. The system of claim 7, further comprising employing a memory manager to register the one or more peer objects in the managed runtime environment.

10. The system of claim 7, wherein the memory allocated for the one or more peer objects is managed by a memory manager in the managed runtime environment that is separate from another memory manager that manages memory for the one or more native objects executing in the native runtime environment.

11. The system of claim 7, further comprising, when the type of interaction is an assignment of another peer object to a weak peer field of a peer object, modifying the peer object's garbage collection handle to become a strong reference garbage collection handle.

12. A computer for managing memory for an application, comprising:
a transceiver that communicates over a network;
a memory that stores at least instructions; and
one or more processors that execute one or more instructions that enable actions, including:
providing one or more peer objects that correspond to one or more native objects that are executing in a native runtime environment, wherein memory is allocated for the one or more peer objects;
generating, in a binding layer that enables a reference to exist in a native runtime environment and reference one of the one or more managed objects, and a reference to exist in a managed runtime environment and reference one of the one or more native objects, the binding layer including one or more binding objects that enable one or more managed objects to interoperate with one or more native objects, one or more managed objects associated with one or more binding objects, one or more garbage collection handles associated with the one or more peer objects, the one or more binding objects including backing fields to mirror weak reference fields; and
when an application executes one or more instructions that interact with the one or more peer objects and the native runtime environment, modifying each garbage collection handle associated with the one or more peer objects based on a type of an interaction; and
when a garbage collection event occurs, deallocating memory for the one or more peer objects based in part on its modified garbage collection handle.

13. The computer of claim 12, further comprising executing the application in the managed runtime environment.

14. The computer of claim 12, further comprising employing a memory manager to register the one or more peer objects in the managed runtime environment.

15. The computer of claim 12, wherein the memory allocated for the one or more peer objects is managed by a memory manager in the managed runtime environment that is separate from another memory manager that manages memory for the one or more native objects executing in the native runtime environment.

16. The computer of claim 12, further comprising, when the type of interaction is an assignment of another peer object to a weak peer field of a peer object, modifying the peer object's garbage collection handle to become a strong reference garbage collection handle.

17. The computer of claim 12, wherein deallocating memory for the one or more peer objects, further comprises, retaining the memory for the one or more peer objects that are associated with a strong reference garbage collector handle.

18. A processor readable non-transitory storage media that includes instructions for managing memory for a computer, wherein the computer executes at least a portion of the instructions to perform actions, comprising:
providing one or more peer objects that correspond to one or more native objects that are executing in a native runtime environment, wherein memory is allocated for the one or more peer objects;
generating, in a binding layer that enables a reference to exist in a native runtime environment and reference one of the one or more managed objects, and a reference to exist in a managed runtime environment and reference one of the one or more native objects, the binding layer including one or more binding objects that enable one or more managed objects to interoperate with one or more native objects, one or more managed objects associated with one or more binding objects, one or more garbage collection handles associated with the one or more peer objects, the one or more binding objects including backing fields to mirror weak reference fields; and when an application executes one or more instructions that interact with the one or more peer objects and the native runtime environment, modifying each garbage collection handle associated with the one or more peer objects based on a type of an interaction; and when a garbage collection event occurs, deallocating memory for the one or more peer objects based in part on its modified garbage collection handle.

19. The media of claim 18, wherein the memory allocated for the one or more peer objects is managed by a memory manager in the managed runtime environment that is separate from another memory manager that manages memory for the one or more native objects executing in the native runtime environment.

20. The media of claim 18, further comprising, when the type of interaction is an assignment of another peer object to a weak peer field of a peer object, modifying the peer object's garbage collection handle to become a strong reference garbage collection handle.

* * * * *